Sept. 12, 1961 R. C. DU BOIS 2,999,478
TEST INSTRUMENT OF THE DIAL TYPE
Filed Feb. 20, 1959 3 Sheets-Sheet 1
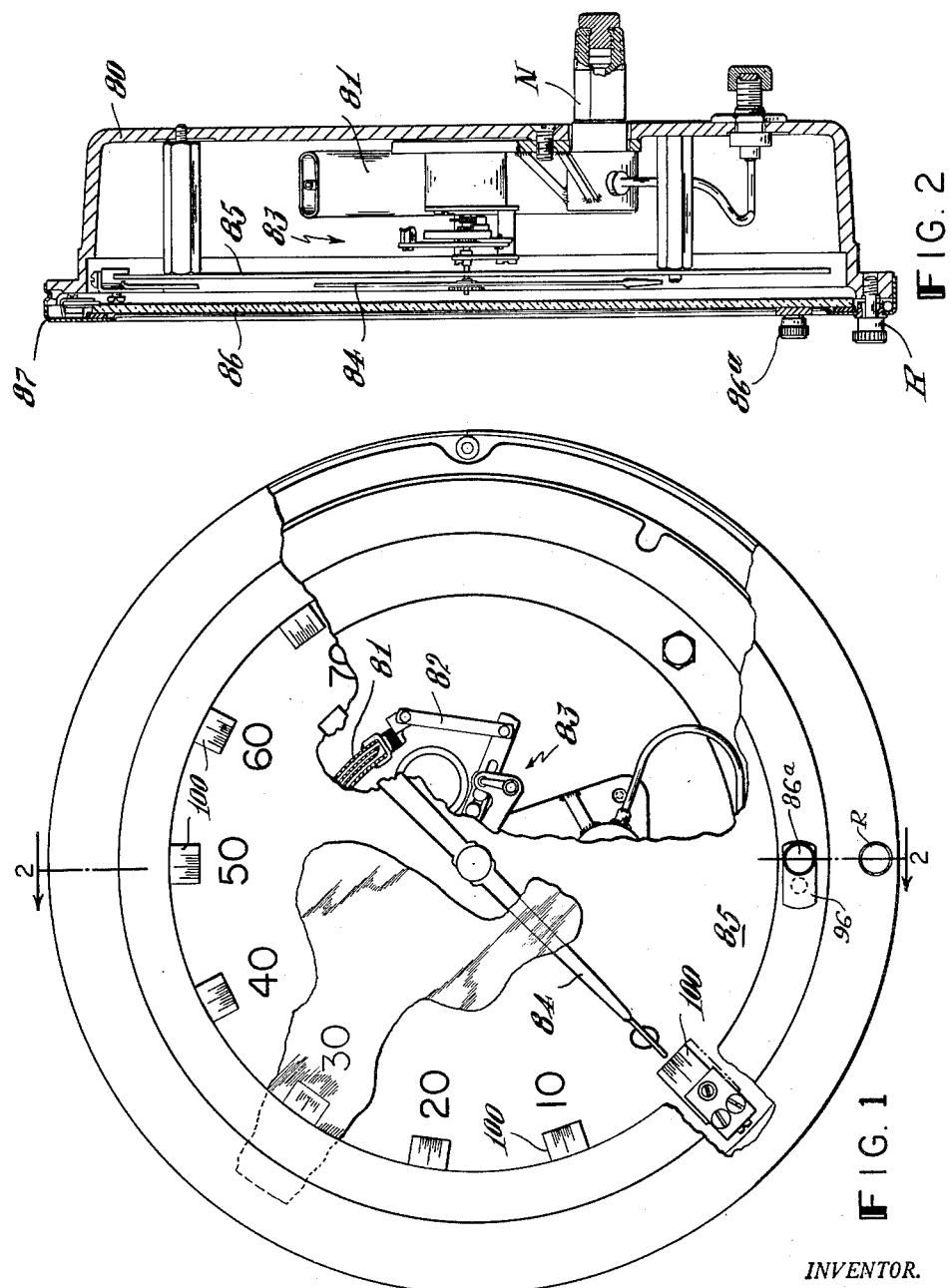
INVENTOR.
Robert C. DuBois
BY
ATT'YS.

Sept. 12, 1961 R. C. DU BOIS 2,999,478
TEST INSTRUMENT OF THE DIAL TYPE
Filed Feb. 20, 1959 3 Sheets-Sheet 2
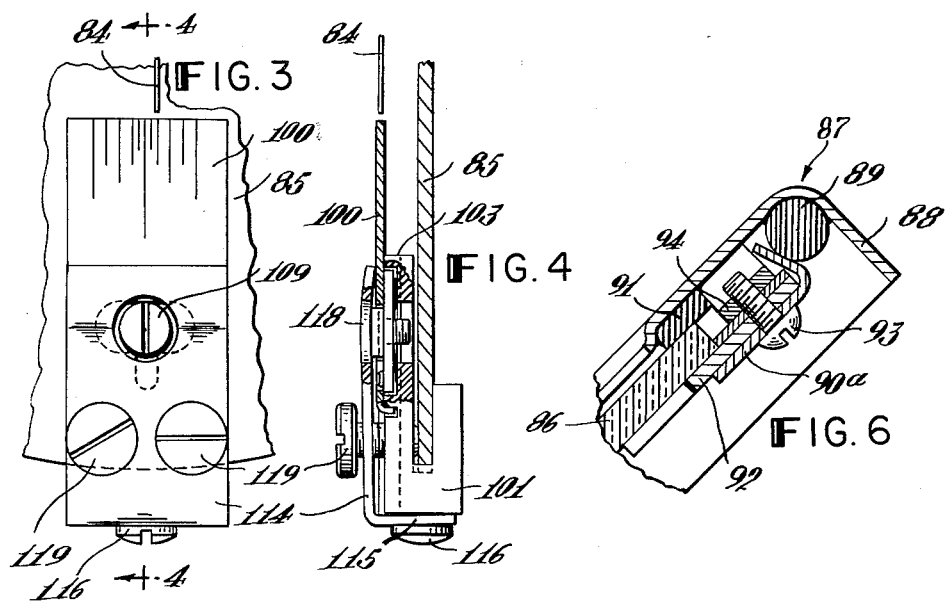
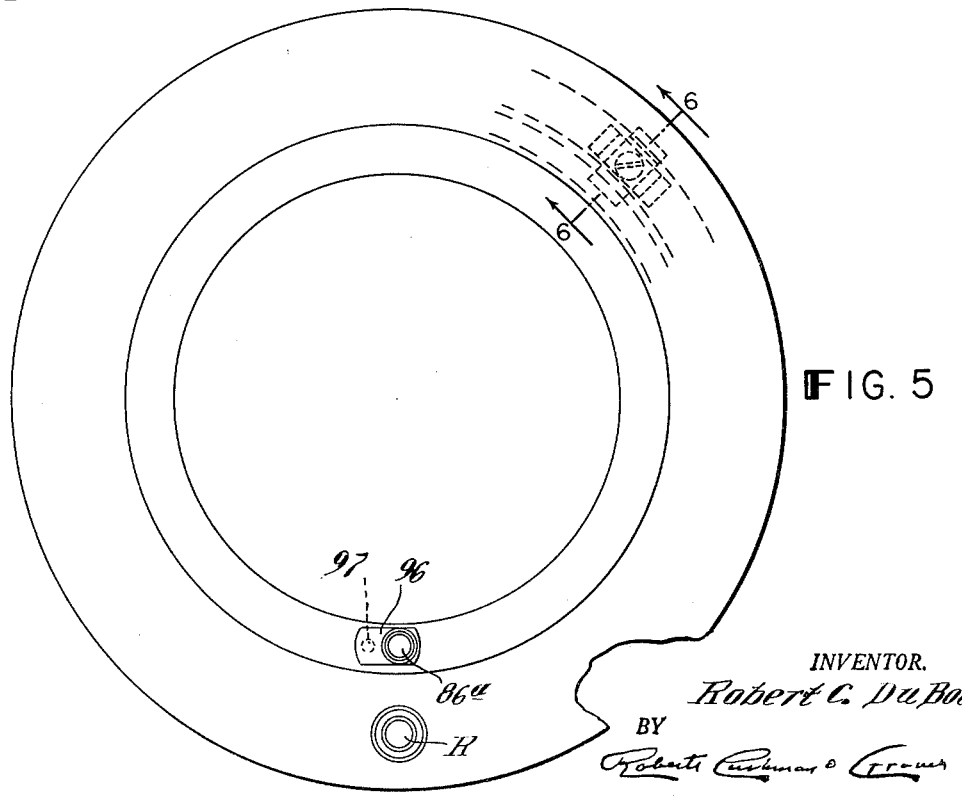
INVENTOR.
Robert C. DuBois
BY
Roberts Cushman & Grover
ATT'YS.

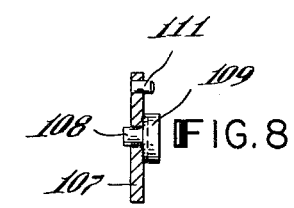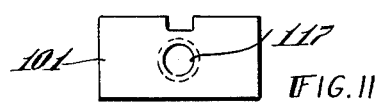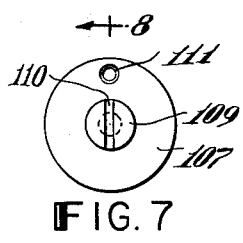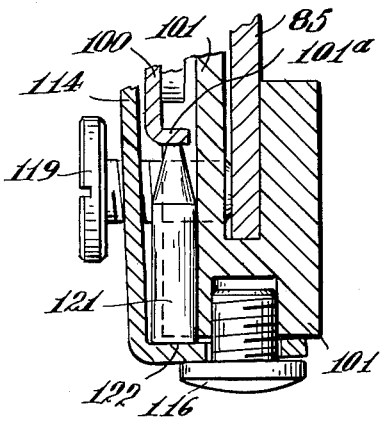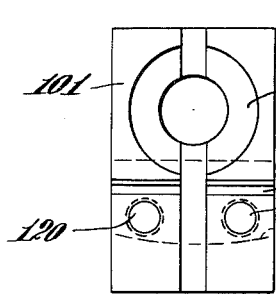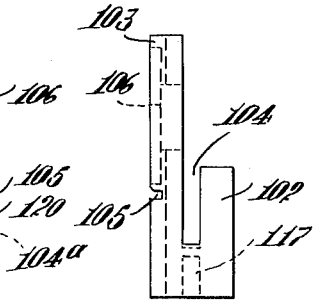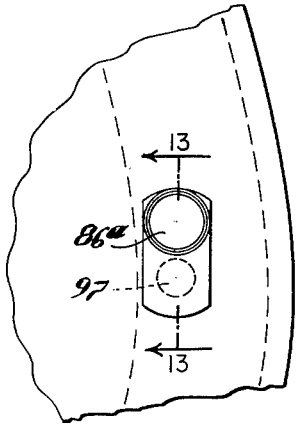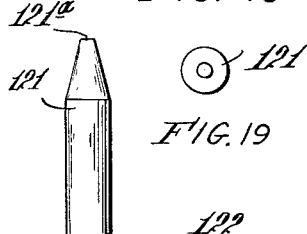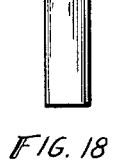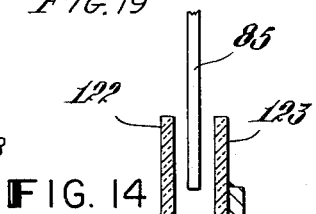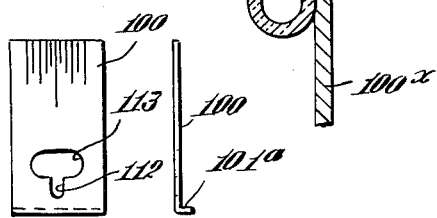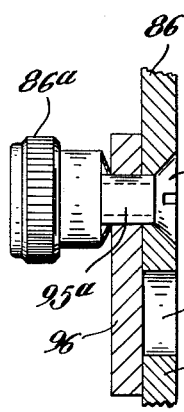

ial instruments, for example, but without limitation, to pressure gauges, and relates more especially to dial instruments of a kind wherein extreme accuracy is demanded, that is to say, an accuracy within a range whose upper limit is of the order of 0.1 percent. Such accuracy is required in test instruments which are employed in the calibration of commercial instruments.

United States Patent Office 2,999,478
Patented Sept. 12, 1961

2,999,478
TEST INSTRUMENT OF THE DIAL TYPE
Robert C. Du Bois, Fairfield, Conn., assignor to Manning, Maxwell & Moore, Incorporated, Stratford, Conn., a corporation of New Jersey
Filed Feb. 20, 1959, Ser. No. 794,636
17 Claims. (Cl. 116—129)

This invention pertains to dial instruments, for example, but without limitation, to pressure gauges, and relates more especially to dial instruments of a kind wherein extreme accuracy is demanded, that is to say, an accuracy within a range whose upper limit is of the order of 0.1 percent. Such accuracy is required in test instruments which are employed in the calibration of commercial instruments.

The customary commercial dial instrument has a flat dial having thereon major graduations with corresponding designating numerals, and a large number of minor graduations, and an index or pointer which is arranged in a plane parallel to and spaced from the face of the dial and which is moved by a so-called "movement mechanism" in response to variations in pressure. The dial graduations and numerals are usually black and printed or otherwise placed upon a white or gray surface, the graduations usually being applied by a printing or similar operation. However, because no two movement mechanisms respond in exactly the same way to a given pressure increase or decrease, it is necessary, by a slow process of calibration, which involves bending or other adjustment of parts of the movement mechanism, to cause the pointer to register as nearly as possible with selected graduations at least, in response to corresponding pressures accurately obtained by a dead-weight tester or the like. However, when the graduations are uniformly spaced on the dials, the best that can be hoped for of the calibration process is to distribute the error with a substantial degree of uniformity over the range of the instrument.

In order to reduce the difficulty and time involved in the calibration of such an instrument, and to obtain greater accuracy than is possible with a dial having uniformly spaced, permanently located graduations, it has heretofore been proposed to provide the dial with movable tabs or carriers upon which the major graduations are placed, these tabs or carriers being adjustable relatively to each other and having means for holding them in adjusted position so that, by subjecting the instrument to a series of accurately known pressures, the tabs or carriers which carry the corresponding major graduations may be accurately set without requiring any adjustment of the parts of the movement mechanism, and with the further possibility that, if during use the instrument change in its response to pressure variations, these tabs or carriers may be readjusted to correspond to the positions of carrier under the new conditions of response. However, such prior suggestions for the use of adjustable carriers or tabs for the major graduations do not always provide for the extreme accuracy requisite in a test gauge, since, in such prior instruments the movement of the tab or carrier relatively to the gauge has customarily been accomplished by digital manipulation, and when, in particular, the means for retaining the tabs or carriers in adjusted position is a friction device, it is difficult, by hand manipulation, to set the tab or carrier in adjusted position with the desired accuracy. Moreover, such prior arrangements, in some instances at least, have required the removal of the dial from the instrument case in order to accomplish the desired adjustment of the graduation carriers, and since this usually means the removal of the pointer or index, such a method of calibrating the instrument is but little less troublesome than that involved in the customary calibration of an instrument having the graduations permanently printed on the dial. When, as above noted, the pointer or index swings in a plane which is spaced from the face of the dial, there is the possibility that a parallax error may occur, particularly when the observer is not directly in front of the instrument, and this is of especial consequence with reference to the use of a test instrument.

Among the objects of the present invention are to provide a dial instrument of the kind in which the graduations corresponding to the major dial divisions are upon or constituted by carriers which are movable independently of each other, but which may be secured to the dial proper in any desired location circumferentially of the dial, and with means whereby such graduations, after a quick and rough manual adjustment to the desired general location, may then be adjusted to the final and extremely accurate position by mechanical means comparable, in accuracy, to a micrometer adjustment. A further object is to provide a test instrument wherein the major dial divisions, at least, are upon parts which are movable independently circumferentially of the dial, said parts also being provided with graduations, designed to indicate minor fractions of a full scale reading, at either side of the major graduation, and with means for so accurately positioning the part on which the graduations are placed that these fractional minor graduations are dependable to show fractional errors in reading corresponding to such percentages. A further object is to provide a dial instrument in which the graduations which represent major dial divisions are upon parts which are movable independently of, but which may be secured to the dial proper at any desired location circumferentially of the latter, and with provision whereby such adjustment of these parts may be accomplished without removing the dial from the instrument case and without removing the transparent panel which protects the dial and pointer. A further object is to provide an instrument of the class described and wherein the major dial graduations are upon parts which are movable independently of the dial, and with provision whereby, after adjustment of these parts, they are held firmly and accurately in the final position of adjustment. A further object is to provide a dial instrument wherein the dial and pointer are so devised as to minimize parallax error in the reading of the instrument. Other and further objects and advantages of the invention will be pointed out in the following more detailed description and by reference to the accompanying drawings wherein:

FIG. 1 is a front elevation of a pressure gauge embodying the present invention, with portions broken away to show interior construction;

FIG. 2 is a vertical section substantially on the line 2—2 of Fig. 1;

FIG. 3 is a fragmentary front elevation of the instrument dial, showing one of the graduation carriers of the present invention mounted thereon and showing an end portion only of the index or pointer;

FIG. 4 is a section substantially on the line 4—4 of FIG. 3;

FIG. 5 is a diagrammatic front elevation, showing the front ring of the cover of the gauge case, but omitting the dial and index;

FIG. 6 is a fragmentary section substantially on the line 6—6 of FIG. 5, but to larger scale;

FIG. 7 is a front elevation, to larger scale than FIG. 3, showing the rotary disc which forms an element of the adjusting means whereby the graduation carrier may be accurately adjusted;

FIG. 8 is a section on the line 8—8 of FIG. 7;

FIG. 9 is an edge view of the body portion of one of the graduation carriers;

FIG. 10 is a front view of the part shown in FIG. 9;

FIG. 11 is a bottom view of the part shown in FIG. 9;

FIG. 12 is a fragmentary front elevation of the cover ring assembly, showing the knob for turning the transparent front panel and the member which normally closes the opening in the transparent panel which gives access to the graduation-carrier adjusting means;

FIG. 13 is a fragmentary section, to larger scale, on the line 13—13 of FIG. 12;

FIG. 14 is a fragmentary radial section through the inner portion of one of the graduation carriers, illustrating a modification and showing the outer end portion only of the index or pointer;

FIG. 15 is a front elevation of a tab, forming an element of the graduation carrier, upon which the graduation marks are placed;

FIG. 16 is an edge elevation of the tab of FIG. 15;

FIG. 17 is a fragmentary section in a plane parallel to that of FIG. 4, but to larger scale than FIG. 4;

FIG. 18 is an elevation of a nylon strut forming an element of the device; and

FIG. 19 is a top view of the strut of FIG. 18.

Referring to the drawings, the numeral 80 (FIG. 2) designates the body of the case of the instrument, here illustrated as a pressure gauge. Within the case is arranged the Bourdon tube 81 whose inner end is connected to a nipple N by means of which pressure fluid is supplied to the instrument and which may also furnish a support for the case. The free end or tip of the Bourdon tube 81 is connected by a link 82 (FIG. 1) to the movement mechanism 83, which, in customary manner moves the index or pointer 84 over the front face of the dial 85, the latter being fixed within the instrument case forwardly of the movement mechanism. As here illustrated, the dial proper has no graduation marks, although it has numerals indicating a series of pressure intervals. The dial and pointer are protected by the transparent panel 86, which is held in position by means of the cover-ring assembly 87 (FIGS. 2 and 6) which is removably secured to the forward edge of the case 80 by any suitable means, including, for example, the thumb screw R (FIG. 2). The ring assembly 87, as shown in FIG. 6, comprises the circumferential cylindrical flange 88 which, with the radial face of the ring 87, forms an angle within which there is arranged the annular gasket 89, which is desirably cemented to the inner surface of the ring and which bears, with resilient pressure, against the forwardly and downwardly directed flange 90 of an annular metal clip 90a, the clip thus being held in assembled relation to the ring 87. Near the inner peripery of the ring 87 and at its inner side, there is cemented another resilient gasket 91. The marginal portion of the transparent panel 86, which may be of glass or plastic, bears against the inner surface of this gasket 91. The rear face of the marginal portion of the circular transparent panel 86 bears against the forward surface of a thrust washer 92, which may, for example, be of nylon, and which is held in properly assembled relation to the other parts by a screw 93 which passes through a hole in the clip 90a and through a hole in the washer 92 and which has threaded engagement with a nut 94. The parts are so relatively adjusted as to permit the transparent panel 86 to be rotated about its axis, and for convenience in rotating this panel there is provided a knob 86a which is secured, by a screw 95 (FIG. 13), to the transparent panel 86, this screw having a cylindrical shank portion 95a which provides a pivotal axis for a cover plate 96 designed normally to close an aperture 97 in the transparent panel 86.

In accordance with the present invention, the main dial graduations are placed upon tabs 100 (FIGS. 1, 3, 15 and 16), which may be of any suitable material, for example, thin sheet metal such as aluminum, or a plastic, each tab constituting part of a carrier. Each carrier, as here illustrated (FIGS. 3, 4, 9, 10 and 11), includes a body portion 101 and means for accurately adjusting the tab 100 relatively to the body portion, and for holding the tab firmly in adjusted position. While, as here shown, the graduated edge of the tab is straight and the tab is guided to move parallel to a tangent to the dial, it is contemplated that the graduated edge of the tab may be arcuate and concentric with the dial, and the tab would then be guided to move in an arcuate path. Each carrier also has means operative to secure its body portion 101 at any desired position circumferentially of the dial at the marginal portion of the latter. The body portion of each carrier, as illustrated in FIGS. 9, 10 and 11, is desirably a unitary block of metal comprising a part 102 which lies to the rear of the dial 85 and a part 103 which is disposed at the front of the dial, the block having a slot 104 whose bottom surface is arcuate, as indicated at 104a (FIG. 10), for the reception of the marginal portion of dial 85. As here illustrated, the part 102 is shorter than the part 103 for economy in material and the part 103 has a transverse rectilinear groove or slot 105 in its forward face for the reception of a rearwardly directed bottom flange 101a (FIG. 16) of the tab 100 upon which the graduations are placed. Obviously, if it were desired to move the tab in an arcuate path, this slot or groove would be arcuate. Above the groove 105, the part 103 is provided, in its forward face, with a shallow circular recess 106 for the reception of an adjusting disc 107 (FIGS. 7 and 8). At its center, this disc 107 is provided with a hole which receives the shank 108 of a stud having a head 109, which is provided with a diametrical slot for the reception of a screwdriver. The shank 108 of this stud is fixed permanently to the disc 107, for example, by welding or brazing. At a point near its circumference the disc 107 is provided with a second hole which receives a pin 111, which is thus eccentric with reference to the center of the disc 107. As shown in FIG. 15, the tab 100, upon which the graduations are placed, is provided, at its lower part, with a centrally located, vertically elongate slot 112 which opens at its upper end into a transversely elongate opening 113. In assemblying the parts, the disc 107 is placed within the recess 106 in the body portion of the carrier with the eccentric pin 111 directed forwardly, and the tab 100 is then arranged against the forward face of the part 103 of the body portion of the carrier with its flange 101a (FIG. 16) in the slot 105 (FIG. 9) and with the head 109 of the stud 108 within the transverse opening 113 of the tab. A cover plate 114 (FIG. 4) overlies the front face of the member 101 and the lower portion of the tab 100, this cover plate having a bottom flange 115 which is secured to the body portion 101 by a screw 116 which engages a screw-threaded bore 117 (FIG. 11) in the lower end of the body portion. This cover plate is provided with an opening 118 (FIG. 4), which registers with the head 109 of the stud by means of which the adjusting disc 107 is turned, so as to expose the slot 110 for the reception of a screwdriver.

As illustrated in FIG. 4, the upper portion of the cover plate 114 is normally deflected rearwardly and, as the material of this cover plate is somewhat resilient, the tightening of the screw 116 causes the upper portion of the cover plate to bear against the forward face of the tab 100 with frictional pressure, thus assisting in holding the tab in adjusted position. As a further means of retaining the parts in adjusted position, there is provided a compression strut or rod 121 of nylon (FIGS. 17, 18 and 19) tapered at its upper end, and whose tip 121a bears against the bend connecting the flange 101a and the vertical portion of the tab 100. This strut is slightly longer than the distance between the floor of the slot 105 (FIG. 9) and the lower face of the body portion 101 of the carrier. The lower end 122 (FIG. 17) of this strut 121 overlies the flange 115 (FIG. 4) of the cover plate 114. When the screw 116 is tightened, the tip of the rod 121 is deformed by pressing against part 101a and so holds the tab steady while permitting adjustment of the tab. The body portion 101 of the carrier is secured, after rough adjustment by hand, to the dial 85 by screws 119 (FIGS. 3 and 4) which pass through openings in the cover plate 114 and into screw-threaded openings 120 (FIG. 10) in the body portion 101 of the carrier. By tightening these screws the body portion of the carrier is clamped firmly to the marginal portion of the dial 85.

When the parts are assembled as above described, the eccentric pin 111 of the adjusting disc is disposed in the vertical slot 112 of the tab 100. By inserting a screwdriver in the slot 110, the disc 107 may be turned and thus, by the movement of the eccentric pin 111, the tab 100 is moved by microscopic amounts transversely relative to the body portion 101 of the carrier, the flange 101a of the tab sliding in the slot 105 and thus keeping the graduation marks on the tab always perpendicular to the bottom face of the carrier body 101. The nylon rod 121 is for the purpose of preventing any slight movement or play of the tab 100 with relation to the body portion of the carrier, and for this purpose is superior to a metal spring, since it offers a more powerful compressive force against the flange 101a of the tab than would be obtainable by a spring of practical size; it engages the flange 101a in such a way as to permit free sliding movement of the tab transversely of the carrier body in response to the operation of the adjusting disc; and, when the parts are disassembled, the rod 121 has no tendency to snap violently out of place as would be true of a highly compressed spring.

In the preferred arrangement, the pointer 84 is arranged to swing in the same plane as that of the tab 100 upon which the graduations are placed, as indicated in FIG. 4, but it is of course within the purview of the invention to place the pointer in a plane forwardly of the plane of the tabs 100, making the pointer long enough to overlie the graduations on the tab so that the graduations are behind the pointer, as is customary in many instruments. With such an arrangement, and to lessen parallax error, it is contemplated that the surface of the tab 100 upon which the graduations are formed may be a mirror surface. Alternatively, it is further contemplated that the tab 100 might be of transparent material and the pointer 84 arranged to swing in a plane behind that of the tab so that the position of the pointer would be read by looking through the tab, and in that event, the forward face of the dial itself might be provided with a mirror surface to facilitate accurate reading. Another arrangement useful in securing an accurate reading may be such as that shown, for example, in FIG. 14, wherein the tab 100x, which may for example be a plastic material, is provided at its free end with a U-shaped member of clear plastic, here shown as having the forward and rear parallel legs 122 and 123, respectively, so located that the tip of the pointer 85 moves in the space between these legs; and, in this instance, the forward face of each of the legs 122 and 123 would be provided with graduations so that, in accurate reading, the pointer would be located in line with corresponding graduations carried by both of the legs 122 and 123.

As here illustrated (FIG. 3), the tab 100 carries a central graduation mark indicating the exact pressure, and this central mark is flanked at opposite sides respectively by a plurality of shorter marks showing deviations from the exact pressure in various percentages of full scale, for instance deviations of ⅛, ¼, ½, ¾ and 1 percent.

In adjusting the instrument preparatory to its use as a test gauge, each of the several carriers may be adjusted by hand along the edge of the dial, for example until the central or main graduation on the tab 100 is disposed substantially opposite to one of the numerals on the dial, and is then fixed in position by tightening screws 6, this being done before the cover ring 87 has been assembled with the gauge case, but without removing the dial or pointer. Thus, as shown in FIG. 3, the position of the pointer 84 may be assumed as that which it takes in response to the operation of a dead-weight tester set for the pressure indicated by a numeral on the dial. However, as compared with the graduations on the tab 100, an error of ¼ percent is indicated. Thus an adjustment of the tab is necessary. This is accomplished by inserting a screwdriver into the slot 110 in the adjusting disc 107, and force is thereby applied for turning the disc so as to move the graduation-carrying tab to the right relatively to the body 101 of the carrier so as to place the central graduation mark accurately and exactly to correspond to the pointer position established by the primary pressure standard. The ring 87 with the transparent panel 86 may now be assembled with the gauge body and fixed in place by means of the screw R. If, after a period of time, it be found that one or more of the graduation points is slightly in error due to changes of the internal parts of the gauge, such as may result from changes in temperature, changes in the characteristics of the Bourdon tube, or changes in the characteristics of the parts of the movement mechanism, such slight errors resulting from such causes, and which might become apparent upon a later check of the gauge by reference to a primary standard, may be corrected without removing the cover ring 87 from the gauge body, by turning the plastic panel 86 by means of the knob 93 until the aperture 97 in the transparent panel has been brought into registry with the head 110 of the stud 108; then, by swinging the cover member 96 from over the opening 97, a screwdriver may be inserted and the disc 107 turned thereby to readjust the graduation-carrying tab to its initial accuracy.

As a more specific example, let it be assumed that it is desired accurately to position the main graduation on a given tab to correspond to a thirty pounds per square inch pressure. The gauge would be connected to a suitable primary standard source of pressure such as a dead-weight tester set for thirty pounds per square inch; the pointer of the gauge would then assume a position somewhere in the neighborhood of the printed graduation numeral 30 on the face of the dial; then, with the screws 119 retracted slightly, the carrier could be moved manually relative to the dial until the central or principal graduation mark on the tab of the carrier is approximately in line with the tip of the pointer. (Such as arrangement is illustrated, for example, in FIG. 3 of the drawings.) Now a screwdriver is inserted in the slot 110 of the adjusting disc and, referring to FIG. 3, is turned in a counterclockwise direction so that the eccentric pin 111, resting in the slot 112 of the tab, forces the tab to move sidewise relatively to the body portion of the carrier until the central or principal graduation on the tab is exactly aligned with the tip of the pointer. By this means extreme accuracy may be obtained such as is desirable in a test gauge. After the adjustment has been made, the tab is held firmly in position relatively to the carrier, which has already been clamped by the tightening of the screws 119 to the dial, by the resilient pressure exerted by the cover plate 114 and by the compressive stress exerted by the nylon rod 121.

While one desirable embodiment of the invention, because of suggested modifications, has herein been disclosed by way of example, it is to be understood that the invention is broadly inclusive of any and all modifications which fall within the terms of the appended claims.

I claim:

1. An instrument of that kind which includes a dial, a pointer and means for moving the pointer relatively to the dial, a graduation carrier and means whereby said carrier may be releasably fixed to the dial whereby a graduation mark on the carrier may be located at a selected part of the dial, characterized in that said carrier comprises a body portion having means for securing it in adjusted position circumferentially of the dial and a tab having thereon an elongate graduation mark which is radial with respect to the axis about which the pointer swings and which represents a major dial division, the tab being adjustable transversely relatively to the body portion of the carrier, means for moving the tab by minute increments relatively to the body portion of the carrier and means whereby the tab is retained in adjusted position.

2. An instrument according to claim 1 which includes a casing for housing the dial, the pointer and the means for moving the latter, characterized in that the means for securing the tab in adjusted position is accessible without removing the pointer or dial.

3. An instrument according to claim 1 wherein the tab which carries the elongate graduation mark representing a major dial division, is provided, at each side, respectively, of said elongate graduation, with graduations indicating fractions of a full scale reading.

4. An instrument according to claim 1, wherein a case houses the dial, the pointer and the pointer-actuating means, said case having a removable cover including a transparent panel at its front, said cover being so constructed and arranged as to permit adjustment of the tab relatively to the body of the carrier without removing the transparent panel from the case.

5. An instrument according to claim 1, comprising a compression strut normally so stressed as frictionally to oppose movement of the graduation-carrying tab relatively to the body portion of the carrier.

6. An instrument of that kind which includes a dial, a pointer and means for moving the pointer relatively to the dial, a graduation carrier, said carrier comprising a body portion having a slot for the reception of the marginal portion of the dial and means whereby the body portion may be clamped to the dial after it has been adjusted circumferentially of the latter, a tab bearing a graduation mark which is radial with respect to the axis about which the pointer swings, said tab being a piece of sheet material having a rearwardly directed flange at its lower edge, the body portion of the carrier having a slot in its front face which receives said flange, means whereby the tab may be caused to move transversely of the body portion of the carrier while its flange slides within said slot, and means whereby the tab is retained in adjusted position.

7. An instrument of that kind which includes a dial, a pointer and means for moving the pointer relatively to the dial, a series of independent graduation carriers, each including a body portion and releasable means whereby the body portion of each respective carrier may be retained in adjusted position circumferentially of the dial proper, each carrier also including a part which is movable relatively to its body portion, said part having a face which is substantially in the plane of motion of the pointer, an elongate graduation on said face, the graduation being radial with reference to the axis about which the pointer swings, means for guiding said graduated part to move in a direction parallel to a tangent to the dial, means preventing unintended motion of the graduated part relative to the body portion of the carrier, and means, including a rotatable element, for moving the graduated part relative to the body portion of the carrier by minute increments.

8. An instrument of that kind which includes a dial, a pointer and means for moving the pointer relatively to the dial, and a series of independent carriers which are movable for adjustment circumferentially of the dial proper, characterized in that each carrier comprises a body portion having a surface engageable with the edge of the dial for guiding the carrier in adjusting it, and means for clamping said body portion to the dial, each carrier also comprising a part on which there is at least one graduation, said part being movable trnsversely of the body portion of the respective carrier, means comprising a rotatable element for adjustably positioning said parts relatively to the body portion, and friction means for retaining the graduation-carrying part in adjusted position relatively to the body portion.

9. A pressure gauge for use in the calibration of commercial pressure gauges and which has a case provided with a transparent front panel, said case housing a dial, a pointer and means for moving the pointer relatively to the dial, means whereby the major graduations of the dial may be adjusted independently circumferentially of the dial without removing the transparent panel, the dial or the pointer from the case of the instrument, so that each such major graduation may be roughly positioned to correspond to a given measured pressure, and further means whereby each such major graduation may be moved by minute increments circumferentially of the dial thereby to position it with a maximum degree of accuracy to register with the pointer when the latter occupies a position corresponding to a definite measured pressure.

10. A test gauge for use in calibrating commercial pressure gauges and which has a case which houses a dial, a pointer and means for moving the pointer relatively to the dial, the dial having thereon characters indicating major intervals only of pressure variation, but being devoid of graduations, and a plurality of independent carriers each movable circumferentially along the marginal portion of the dial and each of said carriers having at least one graduation mark, characterized in that each carrier comprises a rigid body portion having a surface for engagement with the edge of the dial for guiding the carrier while adjusting it circumferentially of the dial and means for clamping the body portion of each such carrier firmly to the dial after such adjustment, each carrier also having a piece of sheet material having a substantially flat forward surface on which the graduation mark is placed, said piece of sheet material being movable relatively to the body portion of the carrier in a path parallel to a tangent to the dial, and means constituting a micrometer adjustment whereby said piece of material may be adjusted by minute increments relatively to the body portion of the carrier thereby to register the graduation mark upon said piece of material with a high degree of accuracy with the tip of the pointer, when the latter occupies a position exactly corresponding to a pressure such as indicated by one of the characters on the face of the dial.

11. An instrument of the class described comprising a dial, a pointer and means for moving the pointer, and a plurality of independent carriers each movable circumferentially along the marginal portion of the dial, each carrier comprising a rigid block of material having a slot which receives the marginal edge of the dial and at least one screw by means of which the block may be clamped to the dial after it has been adjusted circumferentially to the desired position, said screw being accessible at the front of the dial, said block having a circular recess in its forward face which receives a rotatable disc provided with an eccentric stud projecting from its forward face, a tab having, on its forward face, at least one graduation mark, means guiding said tab for movement transversely of the block, means for holding the tab in assembled relation to the block, the tab having a slot which receives said eccentric stud, and means whereby the disc may be rotated thereby to move the tab transversely of the body of the carrier.

12. An instrument of the class described comprising a dial, a pointer and means for moving the pointer, and a plurality of independent carriers each movable circumferentially along the marginal part of the dial, each carrier comprising a rigid block of material and having a surface which engages the edge of the dial thereby to guide said block in adjusting the carrier circumferentially of the dial, and each block having means for clamping it rigidly to the dial when it has been adjusted, each carrier also comprising a part having at least one graduation mark thereon and which is movable relatively to the block circumferentially of the dial, means including a rotatable element operative, when turned, to adjust the graduation-carrying part relatively to the block, the instrument having a case, which comprises a cover including a transparent panel, operative to protect the dial and pointer from dust, said transparent panel being rotatable, relatively to other portions of the case, about its center, and having an aperture so located that, by rotating said panel, the aperture may be brought into registry with the rotatable adjusting element of any selected carrier, and a movable cover normally closing said aperture in the transparent panel.

13. An instrument according to claim 1, wherein the means for adjusting the graduated part transversely relatively to the body portion of the carrier comprises a rotatable part having an eccentric stud which is received in a radial slot in the graduate part, said rotatable part having a slot in its forward face for the reception of a screwdriver whereby the rotatable part may be turned, thus causing the stud, by engagement with a wall of the slot, to move the graduated part.

14. An instrument according to claim 1, wherein the carrier comprises a plate arranged at the front of the block, said plate comprising an elongate resilient portion which contacts the forward face of the graduated part at a point radially outward from the graduation thereon, but radially inward of the location of the means for adjusting the graduated part, and means for so stressing said plate as to cause said elongate part to bear, with resilient pressure, against the graduated part thereby to oppose accidental motion of the graduated part relatively to the block.

15. A dial instrument of that kind in which a casing, having a front cover provided with a transparent panel, houses a dial, a pointer and means for moving the pointer, and wherein a graduation carrier, which is movable circumferentially of the dial and which has means for rigidly clamping it to the dial, is provided with a relatively adjustable part having a graduation mark on its front face, and means for moving said part relatively to the body of the carrier, characterized in that the transparent panel is rotatable relatively to the casing proper and has an aperture providing access to the means for adjusting said tab.

16. A test gauge of the kind wherein a case having a transparent front panel houses a dial, a pointer and means for moving the pointer, the dial being devoid of graduation marks, and a plurality of independent graduation carriers movable circumferentially of the dial, each carrier having a body portion comprising a rigid block which may be moved manually relatively to the dial for an approximate adjustment, and releasable means for rigidly clamping the block to the dial, each carrier also comprising a part provided with at least one graduation mark and which is movable relatively to the body portion transversely of the latter, and means including a disc arranged to rotate in a circular recess in the forward face of the block and which carries an eccentric stud engaging an elongate slot in said graduated part whereby said part may be adjusted by minute increments relatively to the body portion of the carrier thereby to position said graduation mark accurately in registry with the pointer when the latter occupies a known position accurately corresponding to a predetermined pressure.

17. An instrument according to claim 1, wherein the tab comprises two parallel parts spaced to receive the tip of the pointer between them, the front one, at least, of said parts being transparent, each of said parts having at least one graduation mark, the graduation marks carried by the two parts being accurately registered with each other.

References Cited in the file of this patent
UNITED STATES PATENTS

| | | |
|---|---|---|
| 140,867 | Annin | July 15, 1873 |
| 2,717,775 | Jackson | Sept. 13, 1955 |